(No Model.)
L. BAMMERLIN.
STEAMER.
No. 351,685. Patented Oct. 26, 1886.
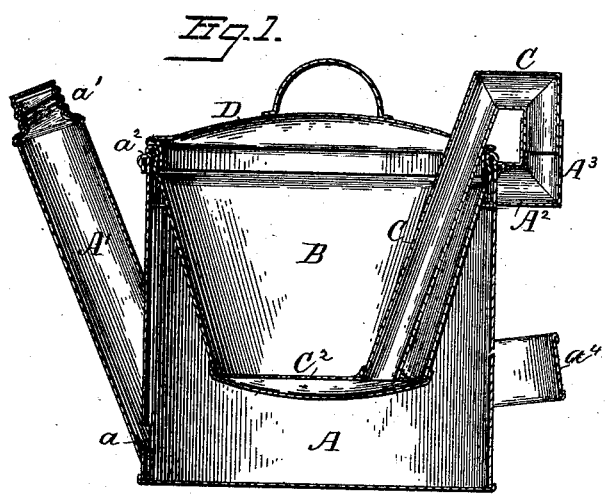
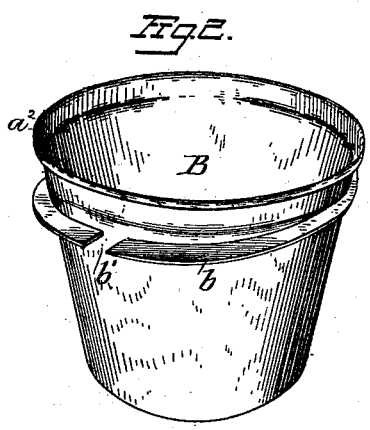
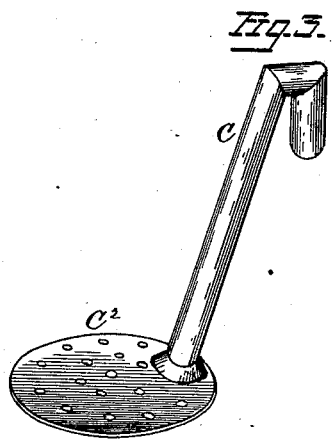
Witnesses:
E. C. Wurdeman
W. B. Masson
Inventor:
Leonard Bammerlin
by E. E. Masson
atty.

UNITED STATES PATENT OFFICE.

LEONARD BAMMERLIN, OF MASSILLON, OHIO.

STEAMER.

SPECIFICATION forming part of Letters Patent No. 351,685, dated October 26, 1886.

Application filed May 17, 1886. Serial No 202,395. (No model.)

*To all whom it may concern:*

Be it known that I, LEONARD BAMMERLIN, a citizen of the United States, residing at Massillon, in the county of Stark and State of Ohio, have invented certain new and useful Improvements in Steamers, of which the following is a specification, reference being had therein to the accompanying drawings.

The object of my invention is to produce a culinary vessel in which food may be cooked by steam in an economical manner; and it consists, principally, in the arrangement of the steam-pipe and steam-passages to prevent water from entering the food-receptacle, and in the means for spreading the steam under the bottom of the food and preventing it from adhering to the bottom of said receptacle. I accomplish these objects by the device illustrated in the accompanying drawings, in which—

Figure 1 is a longitudinal vertical section of a steamer constructed in accordance with my invention. Fig. 2 is a perspective view of the food-receptacle removed from the outer vessel. Fig. 3 is a perspective view of the steam-spreader and the steam-pipe attached thereto.

In said drawings, A represents the outer vessel, in which a sufficient quantity of water is introduced through the inclined spout $A'$, having an opening, $a$, communicating at its lower end with the interior of the outer vessel. The upper end of the spout is closed by a removable plug or screw-cap, $a'$, so as to be steam-tight, but yet easily opened when necessary.

Within the outer vessel is placed the inner vessel, B, in which food may be cooked. Its upper edge forms a close joint with the vessel A and rests at $a^2$ upon the edge of the latter.

To prevent the water in ebullition in the outer vessel from readily reaching its edge, there is formed upon the periphery of the inner vessel, (but it may be on the periphery of the outer vessel,) at a very short distance below its joint, a flange or shelf, $b$, set slightly inclined toward its opening $b'$, to facilitate the return of water condensed thereon to the vessel A. This shelf forms a close joint between the two vessels, except at the point $b'$, where a small segment of the flange is removed to form a passage for the steam produced to reach in a dry state the pipe $A^2$, issuing on the outside of the vessel A, adjacent to its edge.

The pipe $A^2$ is provided with an elbow and a vertical socket, $A^3$, to receive the end of another pipe, C, that extends sufficiently above the edge of the inner vessel to form a handle, by which it can be manipulated to disconnect it when necessary from the pipe $A^2$. The pipe C passes over the edge of the inner vessel, B, and extends to its bottom, where it is provided with a perforated disk, $C^2$, fitting within the inner vessel a short distance above its bottom, to produce at that point a small steam-chamber, from which the steam is diffused evenly under the whole and among the food to be cooked through the small perforations in the disk $C^2$. The inner vessel is closed by a cover, D, fitting over its edge. This cover has a small segment cut out of its edge for the passage of the dipping-pipe C. This pipe C, being independent of the inner vessel, can be removed after the food has been cooked, and permits the food to be dipped out or the vessel to be turned over and emptied without interference of any internal pipe or obstruction. The outer vessel, A, is provided with one or more handles, $a^4$, on the side, to incline it in any direction, either to empty the contents of the inner vessel or the water in the outer vessel.

Having now fully described my invention, I claim—

1. The combination of an outer vessel having an inclined spout, a handle, and a pipe, $A^2$, outwardly issuing from said vessel, and provided with a vertical socket, $A^3$, with an inner vessel, and a pipe, C, entering said vertical socket, and its extremity extending through a perforated disk covering the bottom of the inner vessel, substantially as described.

2. The combination of an outer vessel having an inclined spout, and a pipe, $A^2$, issuing therefrom, and provided with a vertical socket, $A^3$, with an inner vessel having a shelf, $b$, around it, and a pipe, C, having its lower end extending through a perforated disk and its upper end extending over the edge of the inner vessel, substantially as and for the purpose described.

In testimony whereof I affix my signature in presence of two witnesses.

LEONARD BAMMERLIN.

Witnesses:
DANIEL A. MÜLLER,
R. W. McCAUGHEY.